United States Patent
Hyeon et al.

(10) Patent No.: US 9,092,080 B2
(45) Date of Patent: Jul. 28, 2015

(54) ORGANIC LIGHT EMITTING DIODE DISPLAY

(75) Inventors: Ju-Hee Hyeon, Yongin (KR); Hyun-Chol Bang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 260 days.

(21) Appl. No.: 13/566,295

(22) Filed: Aug. 3, 2012

(65) Prior Publication Data
US 2013/0257839 A1 Oct. 3, 2013

(30) Foreign Application Priority Data
Mar. 29, 2012 (KR) .......................... 10-2012-0032386

(51) Int. Cl.
*G09G 3/32* (2006.01)
*G06F 3/038* (2013.01)

(52) U.S. Cl.
CPC *G06F 3/038* (2013.01); *G09G 3/32* (2013.01); *G09G 3/3233* (2013.01); *G09G 2300/0465* (2013.01); *G09G 2300/0819* (2013.01); *G09G 2300/0852* (2013.01); *G09G 2300/0861* (2013.01); *G09G 2320/0219* (2013.01)

(58) Field of Classification Search
None
See application file for complete search history.

(56) References Cited

U.S. PATENT DOCUMENTS

| | | | |
|---|---|---|---|
| 6,771,028 B1 * | 8/2004 | Winters ..................... | 315/169.1 |
| 6,781,321 B2 * | 8/2004 | Ko et al. ..................... | 315/169.3 |
| 7,675,492 B2 | 3/2010 | Park et al. | |
| 7,692,191 B2 | 4/2010 | Kwak et al. | |
| 8,018,408 B2 | 9/2011 | Choi | |
| 8,772,789 B2 * | 7/2014 | Kubota et al. .................... | 257/79 |
| 2005/0057459 A1 * | 3/2005 | Miyazawa ..................... | 345/76 |
| 2005/0162092 A1 * | 7/2005 | Yamazaki et al. .......... | 315/169.3 |
| 2006/0170634 A1 * | 8/2006 | Kwak et al. ..................... | 345/92 |
| 2006/0255726 A1 * | 11/2006 | Kim ............................... | 313/506 |
| 2006/0267885 A1 * | 11/2006 | Kwak et al. ..................... | 345/76 |
| 2007/0108899 A1 * | 5/2007 | Jung et al. ..................... | 313/506 |
| 2007/0236430 A1 * | 10/2007 | Fish ............................... | 345/82 |
| 2008/0007492 A1 * | 1/2008 | Koh et al. ..................... | 345/76 |
| 2008/0111777 A1 | 5/2008 | Kim | |
| 2008/0315189 A1 | 12/2008 | Lee et al. | |
| 2008/0316150 A1 | 12/2008 | Lee et al. | |
| 2009/0243976 A1 * | 10/2009 | Choi ............................... | 345/76 |

(Continued)

FOREIGN PATENT DOCUMENTS

| | | |
|---|---|---|
| KR | 10-0573156 | 4/2006 |
| KR | 10-0688801 | 2/2007 |
| KR | 10-0911980 | 8/2009 |

*Primary Examiner* — Antonio Xavier
(74) *Attorney, Agent, or Firm* — Robert E. Bushnell, Esq.

(57) ABSTRACT

An organic light emitting diode display with improved aperture ratio includes: a substrate; first and second pixels disposed in a first row of the substrate and third and fourth pixels disposed in a second row adjacent to the first row and respectively disposed in the same columns as the first and second pixels; a scan line and a previous scan line applying a scan signal and a previous scan signal, respectively, to the pixel units; a data line and a driving voltage line applying a data signal and a driving voltage, respectively, to the pixel units; and a common initialization voltage line disposed between the first and second pixels and between the third and fourth pixels, commonly connected to the pixel units, and applying an initialization voltage. One common initialization contact hole connected to all pixels units and one initialization voltage line connected to the common initialization contact hole are surrounded by the pixel units.

17 Claims, 4 Drawing Sheets

(56) References Cited

U.S. PATENT DOCUMENTS

| | | | |
|---|---|---|---|
| 2010/0025664 A1* | 2/2010 | Park | 257/40 |
| 2010/0066232 A1* | 3/2010 | Kim et al. | 313/317 |
| 2010/0156762 A1* | 6/2010 | Choi | 345/76 |
| 2010/0220093 A1* | 9/2010 | Choi | 345/213 |
| 2011/0012816 A1* | 1/2011 | Kang et al. | 345/76 |
| 2011/0025659 A1* | 2/2011 | Kwak et al. | 345/205 |
| 2011/0157144 A1* | 6/2011 | Park et al. | 345/212 |
| 2011/0227098 A1* | 9/2011 | Choi | 257/88 |
| 2011/0227889 A1* | 9/2011 | Choi | 345/209 |
| 2011/0285610 A1 | 11/2011 | Yan et al. | |
| 2012/0013597 A1* | 1/2012 | Han | 345/212 |
| 2012/0026144 A1* | 2/2012 | Kang et al. | 345/211 |
| 2012/0105495 A1* | 5/2012 | Choi | 345/690 |
| 2012/0162177 A1* | 6/2012 | Lee | 345/211 |
| 2012/0175605 A1* | 7/2012 | Shin et al. | 257/43 |

* cited by examiner

ORGANIC LIGHT EMITTING DIODE DISPLAY

CLAIM OF PRIORITY

This application makes reference to, incorporates the same herein, and claims all benefits accruing under 35 U.S.C. §119 from an application earlier filed in the Korean Intellectual Property Office on the 29 of Mar. 2012 and there duly assigned Serial No. 10-2012-0032386.

BACKGROUND OF THE INVENTION

1. Field of the Invention

The present invention relates generally to an organic light emitting diode (OLED) display. More specifically, the invention relates to an OLED display which provides an improvement in aperture ratio while increasing storage capacitance.

2. Description of the Related Art

An organic light emitting diode (OLED) display includes two electrodes and an organic emission layer disposed between the two electrodes, and electrons injected from one electrode and holes injected from the other electrode are combined in the organic emission layer so that excitons are formed, and light is emitted by energy generated from the excitons.

In each pixel of the OLED display, a plurality of switching thin film transistors are formed to compensate for non-uniformity of a threshold voltage of driving thin film transistors and deterioration of an organic light emitting diode. In this case, an initialization voltage that initializes the driving thin film transistor is applied to the driving thin film transistor through an initialization voltage line.

Furthermore, in order to improve visibility of the OLED display, a green pixel having excellent visibility is further provided, and thus an OLED display of four color pixels has been applied, and the four color pixels can be arranged according to various types such as a stripe type, a checker type, or pentile type.

In particular, in the four color pixel OLED display, initialization voltage lines are respectively formed in two pixels in one row and in two pixels in an adjacent row, and in this case, each pixel should include an initialization contact hole for connection of the driving thin film transistor of each pixel with the initialization voltage line.

However, pixels of a high resolution OLED display tend to be down-sized, and accordingly a space for a storage capacitor is reduced due to an initialization contact hole formed in each pixel, and an aperture ratio is also decreased due to the initialization contact hole formed in each pixel.

The above information disclosed in this Background section is only for enhancement of an understanding of the background of the described technology, and therefore it may contain information that does not form the prior art that is already known in this country to a person of ordinary skill in the art.

SUMMARY OF THE INVENTION

The present invention has been developed in an effort to provide an organic light emitting diode (OLED) display that can improve an aperture ratio while increasing storage capacitance An OLED display according to an exemplary embodiment may include: a substrate; pixel units including first and second pixels disposed in a first row of the substrate, and third and fourth pixels disposed in a second row that is adjacent to the first row and respectively disposed in the same columns as the first and second pixels; a scan line and a previous scan line respectively applying a scan signal and a previous scan signal to the pixel units; a data line and a driving voltage line crossing the scan line and the previous scan line, and respectively applying a data signal and a driving voltage to the pixel units; and a common initialization voltage line disposed between the first and second pixels and between the third and fourth pixels, commonly connected to the pixel units, and applying an initialization voltage.

The OLED display may further include: a contact hole connection electrode formed in the same layer where the data line and driving voltage line are formed and surrounded by the pixel units; and a protective layer covering the data line, the driving voltage line, and the contact hole connection electrode. The common initialization voltage line may be formed on the protective layer, and the common initialization voltage line may be connected to the contact hole connection electrode of the protective layer through a common initialization contact hole surrounded by the pixel units.

The OLED display may further include: a contact hole connection semiconductor layer formed on the substrate and overlapping the contact hole connection electrode; a gate insulating layer formed on the contact hole connection semiconductor layer; and an interlayer insulating layer formed between the previous scan line which is formed on the gate insulating layer and the contact hole connection electrode.

The contact hole connection semiconductor layer may be connected to the contact hole connection electrode through an auxiliary contact hole formed in the interlayer insulating layer.

The contact hole connection semiconductor layer may be connected to initialization thin film transistors respectively formed in the first, second, third, and fourth pixels.

The scan line may include a first scan line applying a first scan signal to the first and second pixels and a second scan line applying a second scan signal to the third and fourth pixels, and the first scan line and the second scan line may be separated from each other with reference to the common initialization voltage line.

The previous scan line may include a first previous scan line applying a first previous scan signal to the first and second pixels and a second previous scan line applying a second previous scan signal to the third and fourth pixels, and the first previous scan line and the second previous scan line may be adjacent to each other.

The data voltage line may include a first data line applying a first data signal to the first and third pixels and a second data line applying a second data signal to the second and fourth pixels, and the first data line and the second data line may be symmetrical relative to each other with reference to the common initialization contact hole.

The driving voltage line may include a first driving voltage line applying a first driving voltage to the first and third pixels and a second driving voltage line applying a second driving voltage to the second and fourth pixels, and the first driving voltage line and the second driving voltage line may be symmetrical relative to each other with reference to the common initialization contact hole.

The first pixel and the second pixel may be symmetrical relative to the third and fourth pixels with reference to the common initialization voltage line.

The first and third pixels may be symmetrical relative to the second and fourth pixels with reference to the common initialization hole.

According to the present invention, one common initialization contact hole connected to all of the pixels units and one initialization voltage line connected to the common initialization contact hole are disposed in a location surrounded by the pixel units so that the initialization contact hole may not need to be formed in each pixel, thereby improving an aperture ratio.

In addition, the initialization contact hole may not need to be formed in each pixel, and accordingly a space for the storage capacitor can be assured.

Accordingly, the size of the pixel can be reduced, and thus the pixel is applicable to a high resolution OLED display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
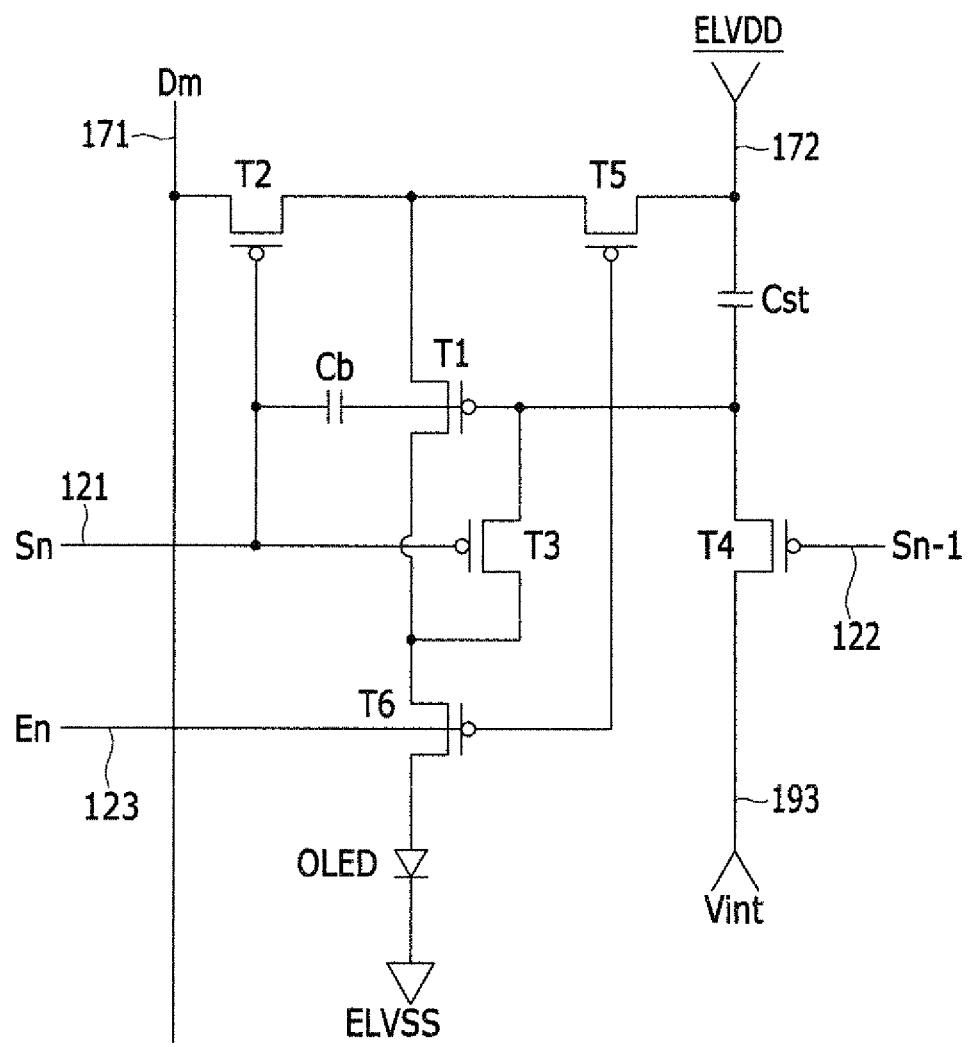
FIG. 1 is a pixel equivalent circuit diagram of an organic light emitting diode (OLED) according to an exemplary embodiment of the present invention.

Hereinafter, the present invention will be described more fully with reference to the accompanying drawings, in which exemplary embodiments of the invention are shown. As those skilled in the art will realize, the described embodiments may be modified in various different ways, all without departing from the spirit or scope of the present invention.

The drawings and description are to be regarded as illustrative in nature and not restrictive. Like reference numerals designate like elements throughout the specification.

Furthermore, the size and thickness of the elements shown in the drawings are provided for better understanding and ease of description, and the present invention is not necessarily limited thereto.

In the drawings, the thickness of layers, films, panels, regions, etc. are exaggerated for clarity. Furthermore, the thickness of some layers and regions are exaggerated in the drawings for better understanding and ease of description. It will be understood that, when an element such as a layer, film, region, or substrate is referred to as being "on" another element, it can be directly on the other element or intervening elements may also be present.

An organic light emitting diode (OLED) display according to an exemplary embodiment of the invention will be described in further detail with reference to FIG. 1 thru FIG. 5.

FIG. 1 is an equivalent circuit diagram of one pixel of an OLED display according to an exemplary embodiment of the present invention.

As shown in FIG. 1, each pixel of the OLED display according to the exemplary embodiment includes a plurality of signal lines 121, 122, 123, 171, 172, and 193, a plurality of thin film transistors T1, T2, T3, T4, T5, and T6 respectively connected to the plurality of signal lines, capacitors Cst and Cb, and an organic light emitting diode OLED.

The thin film transistors include a driving thin film transistor T1, a switching thin film transistor T2, a compensation thin film transistor T3, an initialization thin film transistor T4, a first light emission control thin film transistor T5, and a second light emission control thin film transistor T6, and the capacitors Cst and Cb include a storage capacitor Cst and a boosting capacitor Cb.

The signal lines include a scan line 121 transmitting a scan signal Sn, a previous scan line 122 transmitting a previous scan signal Sn−1 to the initialization thin film transistor T4, a light emission control line 123 transmitting a light emission control signal En to the first light emission control thin film transistor T5 and the second light emission control thin film transistor T6, a data line 171 crossing the scan line 121 and transmitting a data signal Dm, a driving voltage line 172 transmitting a driving voltage ELVDD and formed substantially in parallel with the data line 171, and a common initialization voltage line 193 transmitting an initialization voltage Vint that initializes the driving thin film transistor T1.

A gate electrode of the switching thin film transistor T2 is connected to the scan line 121, a source electrode of the switching thin film transistor T2 is connected to the data line 171, a drain electrode of the switching thin film transistor T2 is electrically connected to a source electrode of the driving thin film transistor T1 and the driving voltage line 172. The switching thin film transistor T2 performs switching operation according to a scan signal transmitted through the scan line 121.

The driving thin film transistor T1 receives a data signal according to the switching operation of the switching thin film transistor T2 and supplies a driving current to the organic light emitting diode OLED.

A gate electrode of the driving thin film transistor T1 is connected to a first end of the storage capacitor Cst, and a second end of the storage capacitor Cst is connected to the driving voltage line 172. In addition, a gate electrode of the switching thin film transistor T2 is connected to a first end of the boosting capacitor Cb, and a second end of the boosting capacitor Cb is connected to a gate electrode of the driving thin film transistor T1.

A drain electrode of the driving thin film transistor T1 is electrically connected to an anode of the organic light emitting diode OLED. In addition, a cathode of the organic light emitting diode OLED is connected to a common voltage ELVSS. Thus, the organic light emitting diode OLED displays an image by emitting light with a driving current transmitted from the driving thin film transistor T1.

Hereinafter, an operational process of the pixel of the OLED display according to the exemplary embodiment will be described in further detail.

First, while the initialization thin film transistor T4 is in the turn-on state according to the previous scan signal Sn−1 transmitted through the previous scan line 122, the first end of the storage capacitor Cst and the gate electrode of the driving thin film transistor T1 are supplied with the initialization voltage Vint.

Next, the switching thin film transistor T2 and the compensation thin film transistor T3 are turned on according to the scan signal Sn transmitted through the scan line 121. While the switching thin film transistor T2 and the compensation thin film transistor T3 are in the turn-on state, the data signal Dm transmitted through the data line 171 is transmitted to the source electrode of the driving thin film transistor T1 and the driving thin film transistor T1 is diode-connected. Then, the gate electrode and the source electrode of the driving thin film transistor T1 are supplied with a voltage obtained by subtracting a threshold voltage of the driving thin film transistor T1 from the data voltage.

Next, the first light emission control thin film transistor T5 and the second light emission control thin film transistor T6 are turned on by the light emission control signal En transmitted through the light emission control line 123, and a voltage at the gate electrode of the driving thin film transistor T1 is boosted by an increase in the scan signal Sn transmitted through the scan line 121.

While the first light emission control thin film transistor T5 and the second light emission control thin film transistor T6 are in the turn-on state, the driving voltage ELVDD of the driving voltage line 172 is supplied to the source electrode of the driving thin film transistor T1 and a driving current according to a voltage difference between the gate electrode and the source electrode flows to the driving thin film transistor T1. The driving current is transmitted to the anode of the organic light emitting diode OLED through the turn-on second light emission control thin film transistor T6 so that the organic light emitting diode OLED emits light.

A pixel unit, wherein four of the pixels of the OLED display shown in FIG. 1 are provided, will now be described in further detail with reference to FIG. 2 thru FIG. 5.

Figure 2:
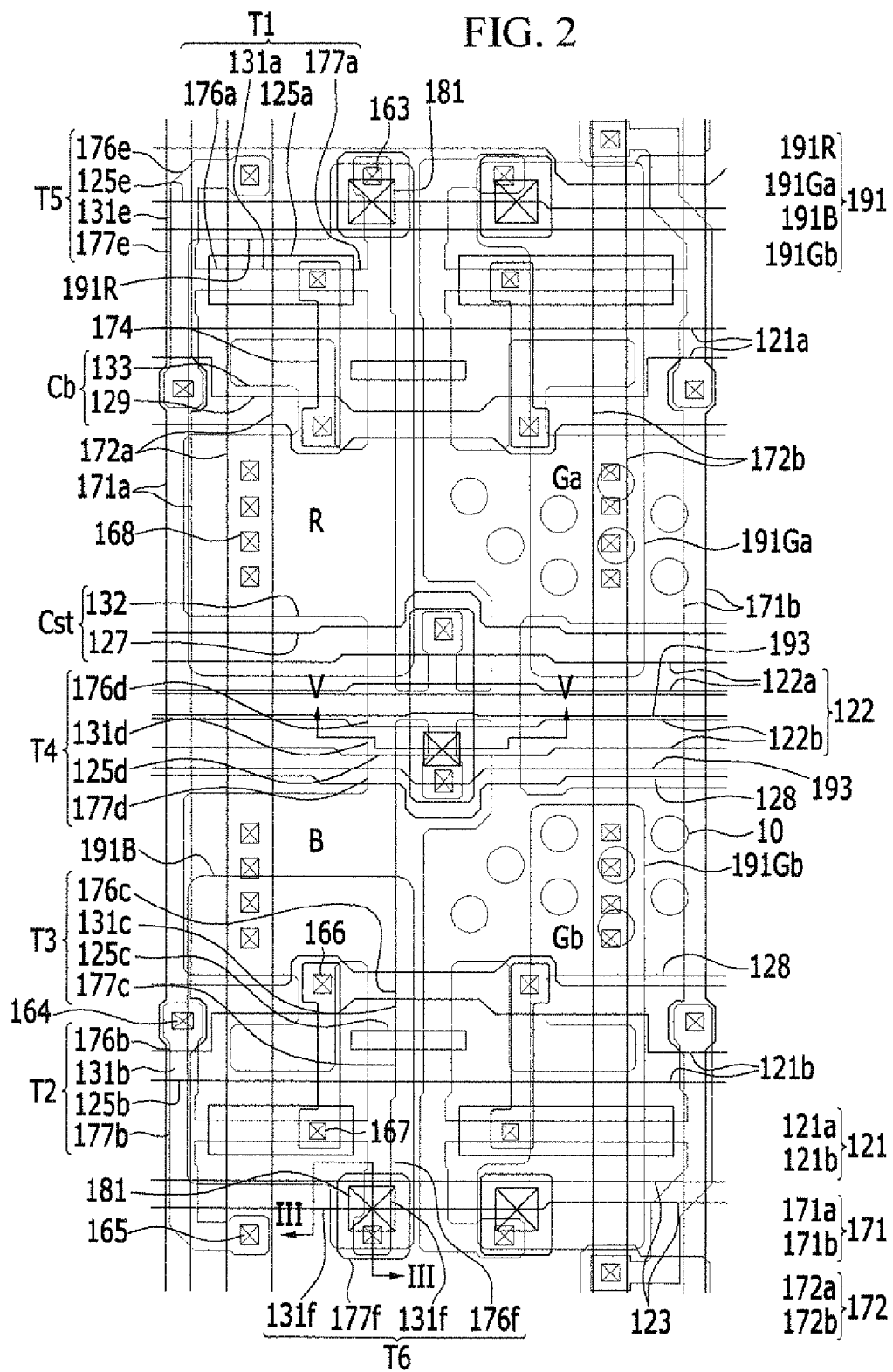
FIG. 2 is a layout view of a pixel unit of the OLED display according to the exemplary embodiment of the present invention.
Figure 3:
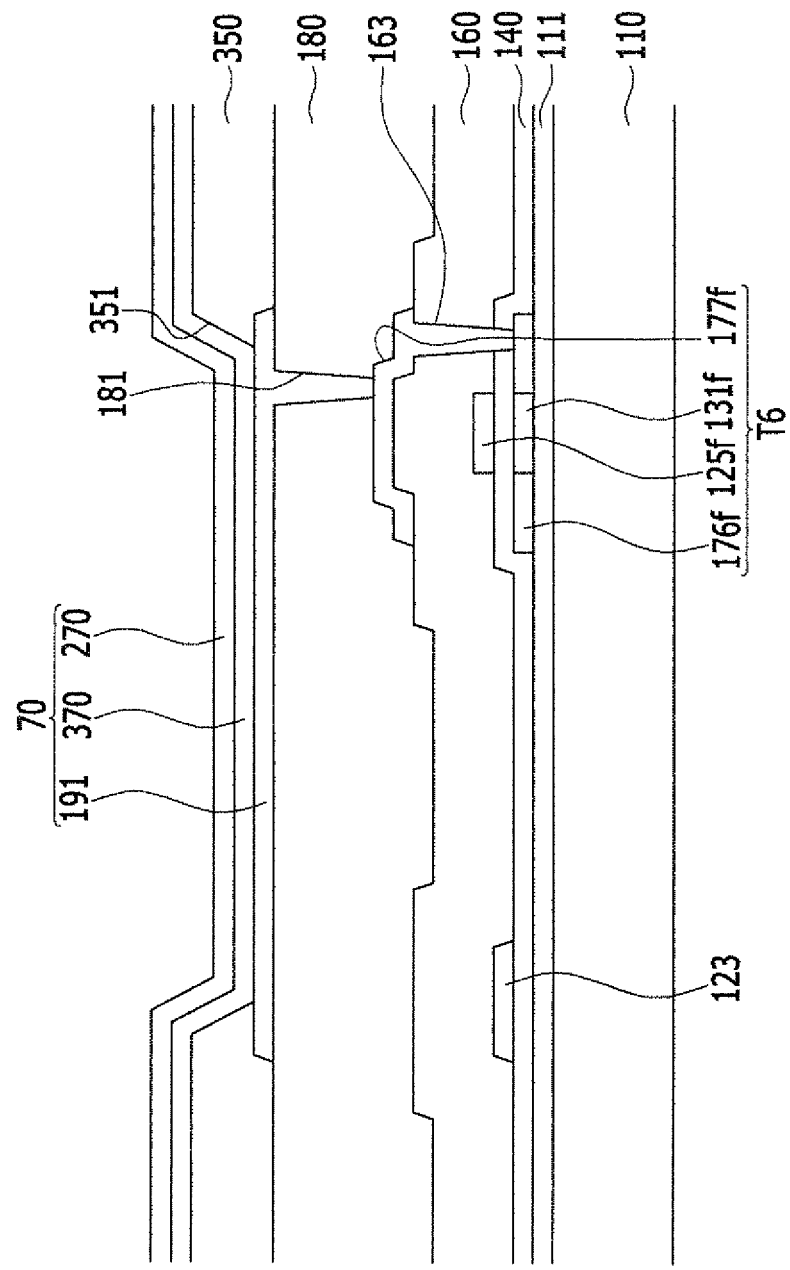
FIG. 3 is a cross-sectional view of the OLED display of FIG. 2, taken along the line III-III.

FIG. 2 is a layout view of the OLED display according to the exemplary embodiment of the present invention, and FIG. 3 is a cross-sectional view of the OLED display of FIG. 2, taken along the line III-III.

As shown in FIG. 2 and FIG. 3, the OLED display according to the exemplary embodiment includes a substrate 110, pixel units R, Ga, B, and Gb formed of four color pixels and formed on the substrate 110, a scan line Scn and a previous scan signal Sn−1 formed along a row direction and respectively applying the scan signal Sn and the previous scan signal Sn−1 to the pixel units R, Ga, B, and Gb, a data line 171 and a driving voltage line 172 crossing the scan line 121 and the previous scan line 122 and respectively applying the data signal Dm and the driving voltage ELVDD, and a common initialization voltage line 193 disposed along a low direction between the pixel units R, Ga, B, and Gb and commonly applying the initialization voltage Vint to the pixel units R, Ga, B, and Gb.

The pixel units R, Ga, B, and Gb include a first pixel, a second pixel, a third pixel, and a fourth pixel. The first and second pixels are disposed in the first row and the third and fourth pixels are disposed in the second row which is adjacent to the first row. In the present exemplary embodiment, the first, second, third, and fourth pixels respectively correspond to a red pixel R, a first green pixel Ga, a blue pixel B, and a second green pixel Gb. Thus, hereinafter, it will be described that the pixel units R, Ga, B, and Gb include a red pixel R, a first green pixel Ga, a blue pixel B, and a second green pixel Gb.

The blue pixel B is disposed in the same column as the red pixel R and the second green pixel Gb is disposed in the same column as the first green pixel Ga. Therefore, the red pixel R, the first green pixel Ga, the blue pixel B, and the second green pixel Gb form a checker-type pixel units R, Ga, B, and Gb.

The scan line 121 includes a first scan line 121a applying a first scan signal to the red pixel R and the first green pixel Ga, and a second scan line 121b applying a second scan signal to the first scan line 121a and to the blue pixel B and the second green pixel Gb. In addition, the previous scan line 122 includes a first previous scan line 122a applying a first previous scan signal to the red pixel R and the first green pixel Ga, and a second previous scan line 122b applying a second previous scan signal to the blue pixel B and the second green pixel Gb.

The first scan line 121a and the second scan line 121b are separated from each other by a constant gap with reference to the common initialization voltage line 193, and the first previous scan line 122a and the second previous scan line 122b are adjacent to each other.

The data line 171 includes a first data line 171a applying a first data signal to the red pixel R and the blue pixel B, and a second data line 171b applying a second data signal to the first green pixel Ga and the second green pixel Gb. In addition, the driving voltage line 172 includes a first driving voltage line 172a applying a first driving voltage to the red pixel R and the blue pixel B, and a second driving voltage line 172b applying a second driving voltage to the first green pixel Ga and the second green pixel Gb.

The first data line 171a and the second data line 171b are disposed symmetrically relative to each other with reference to a common initialization contact hole 185, and the first driving voltage line 172a and the second driving voltage line 172b are symmetrical relative to each other with reference to the common initialization contact hole 185.

The common initialization voltage line 193 is disposed between the red pixel R and the first green pixel Ga and between the blue pixel B and the second green pixel Gb, and is commonly connected to the initialization thin film transistors T4 of each of the pixel units R, Ga, B, and Gb.

Each of the red pixel R, the first green pixel Ga, blue pixel B, and the second green pixel Gb includes the driving thin film transistor T1, the switching thin film transistor T2, the compensation thin film transistor T3, the initialization thin film transistor T4, the first light emission control thin film transistor T5, the second light emission control thin film transistor T6, the storage capacitor Cst, the boosting capacitor Cb, and the organic light emitting diode 70.

The structures of the thin film transistors formed in the red pixel R and the blue pixel B will be described in detail, and the structures of the thin film transistors formed in the first green pixel Ga and the second green pixel Gb are substantially equivalent to the structures of the thin film transistors formed in the red pixel R and the blue pixel B.

The driving thin film transistor T1 includes a driving semiconductor layer 131a, a driving gate electrode 125a, a driving source electrode 176a, and a driving drain electrode 177a. The driving source electrode 176a corresponds to a driving source area of the driving semiconductor layer 131a, and the driving drain electrode 177a corresponds to a driving drain area of the driving semiconductor layer 131a.

The switching thin film transistor T2 includes a switching semiconductor layer 131b, a switching gate electrode 125b, a switching source electrode 176b, and a switching drain electrode 177b.

The compensation thin film transistor T3 includes a compensation semiconductor layer 131c, a compensation gate electrode 125c, a compensation source electrode 176c, and a compensation drain electrode 177c, and the initialization thin film transistor T4 includes an initialization semiconductor layer 131d, an initialization gate electrode 125d, an initialization source electrode 176d, and an initialization drain electrode 177e.

The first light emission control thin film transistor T5 includes a first light emission control semiconductor layer 131e, a first light emission control gate electrode 125e, a first light emission control source electrode 176e, and a first light emission control drain electrode 177e, and the second light emission control thin film transistor T6 includes a second light emission control semiconductor layer 131*f*, a second light emission control gate electrode 125*f*, a second light emission control source electrode 176*f*, and a second light emission control drain electrode 177*f*.

The storage capacitor Cst includes a first capacitor plate 132 and a second capacitor plate 127 with a gate insulating layer 140 interposed therebetween. Here, the interlayer insulating layer 140 becomes a dielectric material, and capacity is determined by the amount of charge charged in the storage capacitor Cst and a voltage between the two capacitor plates 132 and 127.

The driving semiconductor layer 131 of the driving thin film transistor T1 connects the switching semiconductor layer 131*b* and the compensation semiconductor layer 131*c* to each other, and connects the first light emission control semiconductor layer 131*e* and the second light emission control semiconductor layer 131*f* to each other.

Thus, the driving source electrode 176*a* is connected to the switching drain electrode 177*b* and the first light emission control drain electrode 177*e*, and the driving drain electrode 177*a* is connected to the compensation drain electrode 177*c* and the second light emission control source electrode 176*f*.

The first capacitor plate 132 of the storage capacitor Cst is connected to the compensation source electrode 176*c* and the initialization drain electrode 177*d*, and the second capacitor plate 128 is connected to the common voltage line 193 and is formed substantially in parallel with the scan line 121.

The first capacitor plate 133 of the boosting capacitor Cb is connected to the driving gate electrode 125*a* through a connection member 174, and the second capacitor plate 129 is a portion protruding from the scan line 121.

The switching thin film transistor T2 is used as a switching element for selecting a pixel for light emission. The switching gate electrode 125*b* is connected to the scan line 121. The switching source electrode 176*b* is connected to the data line 171. The switching drain electrode 177*b* is connected to the driving thin film transistor T1 and the first light emission control thin film transistor T5.

The second light emission control drain electrode 177*f* of the second light emission control thin film transistor T6 is directly connected to a pixel electrode 191 of the organic light emitting diode 70 through a contact hole 181 of a protective layer 180.

The red pixel R and the first green pixel Ga including the thin film transistors T1, T2, T3, T4, T5, and T6 are symmetrical relative to the blue pixel B and the second green pixel Gb with reference to the common initialization voltage line 193.

In addition, the red pixel R and the blue pixel B are symmetrical relative to the first green pixel Ga and the second green pixel Gb with reference to the common initialization contact hole 185.

Hereinafter, the structure of the OLED display according to the exemplary embodiment will be described according to a layering sequence with reference to FIG. 3.

In particular, the structure of a thin film transistor will be described based on the second light emission control thin film transistor T6. In addition, the other thin film transistors T1, T2, T3, T4, and T5 are almost the same in layering structure as the second light emission control thin film transistor T6, and therefore no further description of the thin film transistors T1, T2, T3, T4, and T5 will be provided.

A buffer layer 111 is formed on the substrate 110, and the second light emission control semiconductor layer 131*f* is formed on the buffer layer 111. The substrate 110 is formed of an insulating substrate made of glass, quartz, ceramic, plastic, or the like. The second light emission control semiconductor layer 131*f* is formed of a polysilicon layer. In addition, the second light emission control semiconductor layer 131*f* includes a channel area that is not doped with an impurity, and a source area and a drain area that are p+ doped at both sides of the channel area. Here, the impurity may be changed according to the type of thin film transistor.

A gate insulation layer 140 formed of silicon nitride (SiNx) or silicon oxide ($SiO_2$) is formed on the second light emission control semiconductor layer 131*f*.

The scan line 121 including the switching gate electrode 125*b* and the compensation gate electrode 125*c*, the previous scan line 122 including the initialization gate electrode 125*d*, the driving gate electrode 125*a*, and the light emission control line 123 including the second light emission control gate electrode 125*f* are formed on the gate insulating layer 140. The second light emission control gate electrode 125*f* is formed so as to overlap with at least a part, in particular, the channel area, of the second light emission control semiconductor layer 131*f*. The gate wire further includes a second capacitor plate 127 forming a storage capacitor. The second capacitor plate 127 is connected to the driving voltage line 172 through the contact hole 168.

An interlayer insulating layer 126 which covers the second light emission control gate electrode 125*e* is formed on the gate insulating layer 140. The gate insulating layer 140 and the interlayer insulating layer 160 include a contact hole 163 exposing a drain area of the second light emission control semiconductor layer 131*f*. Like the gate insulating layer 140, the interlayer insulating layer 160 is formed using a ceramic-based material such as silicon nitride (SiNx) or silicon oxide (SiO2).

A data wire, including the data line 171 that includes the switching source electrode 176*b*, the connection member 174, the second light emission control drain electrode 177*f*, and the driving voltage line 172, is formed on the interlayer insulating layer 160.

In addition, the switching source electrode 176*b* and the second light emission control drain electrode 177*f* are respectively connected to the source area of the switching semiconductor layer 131*b* and the drain area of the second light emission control semiconductor layer 131*f* through the contact holes 162 and 163, respectively, formed in the interlayer insulating layer 160 and the gate insulating layer 140.

The protective layer 180, which covers the data wires 171, 174, 177*f*, and 172, is formed on interlayer insulating layer 160, and the pixel electrode 191 is formed on the protective layer 180. The pixel electrode 191 is connected to the second light emission control drain electrode 177*f* through the contact hole 181 formed in the protective layer 180.

A barrier rib 350 is formed on an edge of the pixel electrode 191 and the protective layer 180, and the barrier rib 350 includes a barrier rib opening 351 that exposes the pixel electrode 191. The barrier rib 350 may be formed of a resin such as a polyacrylates resin and polyimides or a silica-based inorganic material.

An organic emission layer 370 is formed on the pixel electrode 191 exposed through the barrier rib opening 351, and a common electrode 270 is formed on the organic emission layer 370. Accordingly, the organic light emitting diode 70, including the pixel electrode 191, the organic emission layer 370, and the common electrode 270, is formed.

Here, the pixel electrode 191 is an anode which is a hole injection electrode, and the common electrode 270 is a cathode which is an electron injection electrode. However, the exemplary embodiment of the invention is not limited thereto, and the pixel electrode 191 may be a cathode and the common electrode 270 may be an anode according to the driving method of the OLED display. Holes and electrons are injected from the pixel electrode 191 and the common electrode 270 into the organic light emitting layer 370, and when exitons, formed as the holes and electrons injected into the organic light emitting layer 370, are combined and change from a base state to an excited state, the organic light emitting layer 370 emits light.

The organic emission layer 370 is formed of a low molecular organic material or a high molecular organic material such as Poly 3,4-ethylenedioxythiophene (PEDOT). In addition, the organic emission layer 370 may be formed of a multilayer including at least one of an emission layer, a hole injection layer (HIL), a hole transport layer (HTL), an electron transport layer (ETL), and an electron injection layer (EIL). When the organic emission layer 370 includes all the above-stated layers, the hole injection layer (HIL) is disposed on the first electrode 71 which is a hole injection electrode, and the hole transport layer (HTL), the emission layer, the electron transport layer (ETL), and the electron injection layer (EIL) are sequentially layered thereon. Since the common electrode 270 is formed of a reflective conductive material, the OLED display is formed as a bottom emission type OLED display. The reflective material may include lithium (Li), calcium (Ca), fluoride lithium/calcium (LiF/Ca), fluoride lithium/aluminum (LiF/Al), aluminum (Al), silver (Ag), magnesium (Mg), and gold (Au).

Hereinafter, the common initialization contact hole formed in a location surrounded by the pixel units will now be described in further detail.

Figure 4:
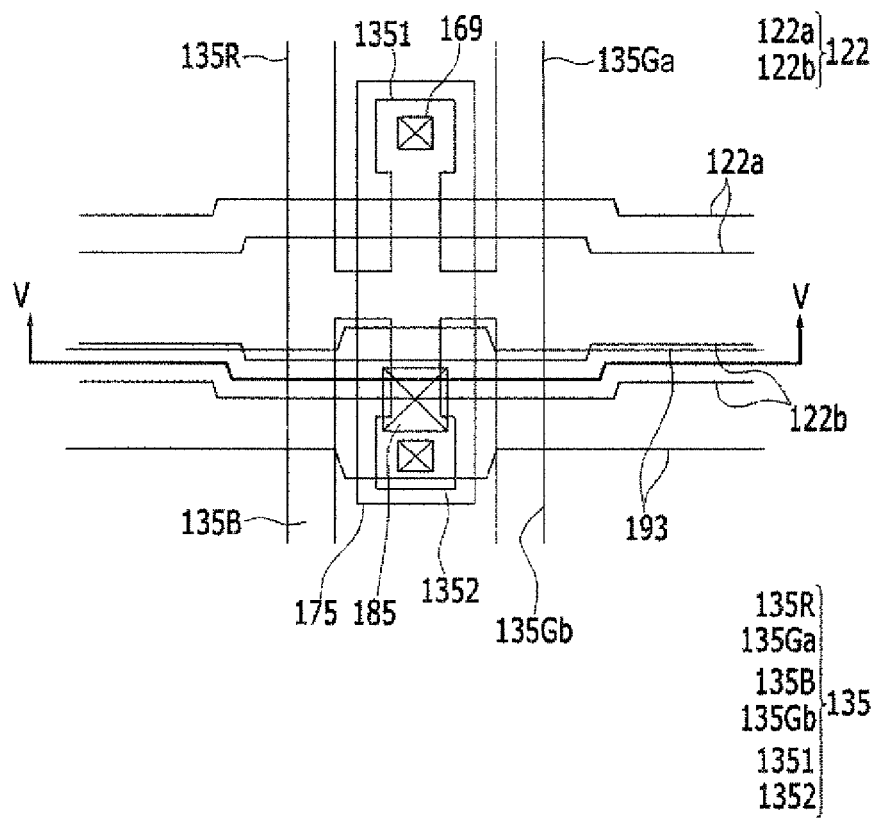
FIG. 4 is an enlarged layout view of a portion of a common initialization contact hole of the OLED display of FIG. 2.
Figure 5:
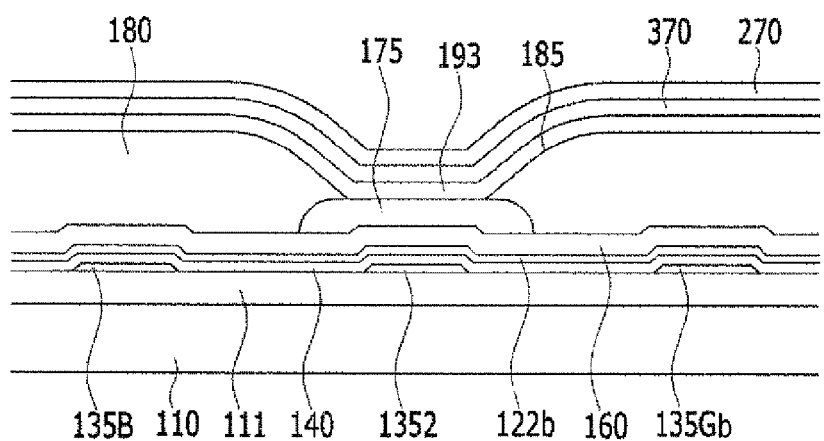
FIG. 5 is a cross-sectional view of FIG. 2 and FIG. 4, taken along the line V-V.

FIG. 4 is an enlarged layout view of a portion of the common initialization contact hole of FIG. 2, and FIG. 5 is a cross-sectional view of FIG. 2 and FIG. 4, taken along the line V-V.

As shown in FIG. 4 and FIG. 5, the buffer layer 111 is formed on the substrate 110, and a contact hole connection semiconductor layer 135 is formed on the buffer layer 111. The contact hole connection semiconductor layer 135 includes four external connection branches 135R, 135Ga, 135B, and 135Gb and two internal connection branches 1351 and 1352. The four external connection branches 135R, 135Ga, 135B, and 135Gb are respectively connected with the initialization semiconductor layer 131 of each of the pixel units R, Ga, B, and Gb.

The gate insulating layer 140 is formed on the contact hole connection semiconductor layer 135, the previous scan line 122b is formed on the gate insulating layer 140, and interlayer insulating layer 160 is formed on previous scan line 122b. A contact hole connection electrode 175 is formed on the interlayer insulating layer 160. The contact hole connection electrode 175 is surrounded by the pixel units R, Ga, B, and Gb, and is formed in the same layer where the data line 171 and the driving voltage line 172 are formed. The two internal connection branches of the contact hole connection semiconductor layer 135 are connected to the contact hole connection electrode 175 through an auxiliary contact hole 169 formed in the interlayer insulating layer 160.

The protective layer 180 is formed on the contact hole connection electrode 175 and the interlayer insulating layer 160, and the common initialization voltage line 193 is formed on the protective layer 180. One common initialization contact hole 185 which exposes the contact hole connection electrode 175 is formed in the protective layer 180. The common initialization contact hole 185 is formed in a location surrounded by the pixel units R, Ga, B, and Gb, and the common initialization voltage line 193 is connected to the contact hole connection electrode 175 through the common initialization contact hole 185.

Thus, when the previous scan signal is transmitted through the previous scan line 122, the initialization thin film transistor T4 of each of the pixel units R, Ga, B, and Gb connected to the previous scan line 122 is turned on. In this case, an initialization voltage transmitted through the common initialization voltage line 193 is transmitted to the contact hole connection electrode 175 through the common initialization contact hole 185, and subsequently, the initialization voltage is transmitted to the contact hole connection semiconductor layer 135 through the auxiliary contact hole 169. Thus, the initialization voltage is supplied to the gate electrode of the driving thin film transistor T1 of each of the pixel units through the four external connection branches 135R, 135Ga, 135B, and 135Gb so as to initialize the driving thin film transistor T1.

As described, one common initialization contact hole 185 connected to all of the pixel units R, Ga, B, and Gb and one common initialization voltage line 193 connected to the common initialization contact hole 185 are formed in a location surrounded by the pixel units R, Ga, B, and Gb so that an initialization contact hole may not need to be formed in each pixel, thereby improving the aperture ratio.

In addition, the initialization contact hole may not need to be formed in each pixel, and accordingly a space for the storage capacitor can be assured.

Accordingly, the size of the pixel can be reduced, and thus the pixel is applicable to a high resolution OLED display.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic light emitting diode (OLED) display device, comprising:

a substrate;

pixel units including first and second pixels disposed in a first row of the substrate, and third and fourth pixels disposed in a second row adjacent to the first row, said first and third pixels are located in a first column and said second and fourth pixels are located in a second column with said first column being adjacent to said second column, said first row is a separate and different row from said second row and said first column is a separate and different column from said second column;

a scan line and a previous scan line for applying a scan signal and a previous scan signal, respectively, to the pixel units;

a data line and a driving voltage line crossing the scan line and the previous scan line for applying a data signal and a driving voltage, respectively, to the pixel units;

a common initialization voltage line disposed between the first and second row, said common initialization voltage line disposed between the first and third pixels and between the second and fourth pixels, and said common initialization voltage line commonly connected to the pixel units, for applying an initialization voltage; and a contact hole connection electrode formed in a same layer as the data line and driving voltage line are formed, and said contact hole electrode is electrically connected to the pixel units and surrounded by the pixel units;

wherein the common initialization voltage line is connected to the contact hole connection electrode through a common initialization contact hole surrounded by the pixel units, and wherein said common initialization voltage line applies the initialization voltage to each of the first, second, third and fourth pixels via the contact hole and the contact hole connection electrode.

2. The OLED display device of claim 1, further comprising:
a protective layer covering the data line, the driving voltage line, and the contact hole connection electrode; and
wherein the common initialization voltage line is formed on the protective layer.

3. The OLED display device of claim 2, further comprising:
a contact hole connection semiconductor layer formed on the substrate and overlapping the contact hole connection electrode;
a gate insulating layer formed on the contact hole connection semiconductor layer and having a previous scan line formed thereon; and
an interlayer insulating layer formed between the previous scan line that is formed on the gate insulating layer and the contact hole connection electrode.

4. The OLED display device of claim 3, wherein the contact hole connection semiconductor layer is connected to the contact hole connection electrode through an auxiliary contact hole formed in the interlayer insulating layer.

5. The OLED display device of claim 3, wherein the contact hole connection semiconductor layer is connected to initialization thin film transistors respectively formed in the first, second, third, and fourth pixels.

6. The OLED display device of claim 5, wherein the first pixel and the second pixel are symmetrical relative to the third and fourth pixels with reference to the common initialization voltage line.

7. The OLED display device of claim 6, wherein the first and third pixels are symmetrical relative to the second and fourth pixels with reference to the common initialization hole.

8. The OLED display device of claim 3, wherein the first pixel and the second pixel are symmetrical relative to the third and fourth pixels with reference to the common initialization voltage line.

9. The OLED display device of claim 8, wherein the first and third pixels are symmetrical relative to the second and fourth pixels with reference to the common initialization hole.

10. The OLED display device of claim 9, wherein the contact hole connection semiconductor layer is connected to the contact hole connection electrode through an auxiliary contact hole formed in the interlayer insulating layer.

11. The OLED display device of claim 10, wherein the contact hole connection semiconductor layer is connected to initialization thin film transistors respectively formed in the first, second, third, and fourth pixels.

12. The OLED display device of claim 2, wherein the first pixel and the second pixel are symmetrical relative to the third and fourth pixels with reference to the common initialization voltage line.

13. The OLED display device of claim 12, wherein the first and third pixels are symmetrical relative to the second and fourth pixels with reference to the common initialization hole.

14. The OLED display device of claim 2, wherein the scan line comprises a first scan line applying a first scan signal to the first and second pixels and a second scan line applying a second scan signal to the third and fourth pixels, and wherein the first scan line and the second scan line are separated from each other with respect to the common initialization voltage line.

15. The OLED display device of claim 14, wherein the previous scan line comprises a first previous scan line applying a first previous scan signal to the first and second pixels and a second previous scan line applying a second scan signal to the third and fourth pixels, and wherein the first previous scan line and the second previous scan line are adjacent to each other.

16. The OLED display device of claim 15, wherein the data voltage line comprises a first data line applying a first data signal to the first and third pixels and a second data line applying a second data signal to the second and fourth pixels, and wherein the first data line and the second data line are symmetrical relative to each other with reference to the common initialization contact hole.

17. The OLED display device of claim 16, wherein the driving voltage line comprises a first driving voltage line applying a first driving voltage to the first and third pixels and a second driving voltage line applying a second driving voltage to the second and fourth pixels, and wherein the first driving voltage line and the second driving voltage line are symmetrical relative to each other with reference to the common initialization contact hole.

* * * * *